United States Patent
Kawashima et al.

(10) Patent No.: US 6,334,955 B1
(45) Date of Patent: Jan. 1, 2002

(54) FRESH WATER GENERATOR AND FRESH WATER GENERATING METHOD

(75) Inventors: Toshiyuki Kawashima; Ichirou Kawada, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/421,998

(22) Filed: Oct. 20, 1999

(30) Foreign Application Priority Data

Oct. 20, 1998 (JP) .......................................... 10-298864
Jun. 24, 1999 (JP) .......................................... 11-178991

(51) Int. Cl.$^7$ ............................................. B01D 65/02
(52) U.S. Cl. .................. 210/636; 210/321.69; 210/637; 210/652; 210/669
(58) Field of Search ............................ 210/138, 257.2, 210/333.01, 321.69, 259, 636, 652, 669, 137, 139, 321.65, 637, 651

(56) References Cited

U.S. PATENT DOCUMENTS

| | | | | |
|---|---|---|---|---|
| 3,498,910 A | * | 3/1970 | Mendelson | ................. 210/652 |
| 3,639,231 A | * | 2/1972 | Bresler | |
| 3,707,231 A | * | 12/1972 | Bradley | |
| 3,716,141 A | * | 2/1973 | Spatz | .................... 210/321.69 |
| T921,001 I4 | * | 4/1974 | Devaney | .................... 210/652 |
| 3,856,676 A | | 12/1974 | Grimme, Jr. et al. | ...... 210/96.2 |
| 4,046,685 A | * | 9/1977 | Bray | ......................... 210/652 |
| 4,176,063 A | | 11/1979 | Tyler | ........................... 210/101 |
| 4,193,872 A | | 3/1980 | Parkinson | ................... 210/149 |
| 4,218,317 A | | 8/1980 | Kirschmann | ................ 210/117 |
| 4,391,712 A | | 7/1983 | Tyler et al. | ................. 210/652 |
| 5,122,265 A | | 6/1992 | Mora et al. | ................. 210/134 |
| 5,147,533 A | * | 9/1992 | Lipshultz et al. | ...... 210/321.69 |
| 5,674,398 A | * | 10/1997 | Hirose | |
| 6,190,566 B1 | * | 2/2001 | Uhlinger et al. | ........... 210/652 |

FOREIGN PATENT DOCUMENTS

| | | |
|---|---|---|
| DE | 26 27 366 A 1 | 12/1977 |
| DE | 37 34 600 A 1 | 5/1989 |
| DE | 38 28 906 C 1 | 7/1989 |
| DE | 40 15 336 A 1 | 11/1991 |
| GB | 1 445 779 | 4/1974 |

* cited by examiner

Primary Examiner—Joseph W. Drodge
(74) Attorney, Agent, or Firm—Akin, Gump, Strauss, Hauer & Feld, L.L.P.

(57) ABSTRACT

A wash water pipe having a flushing valve inserted therein is connected with a concentrated water outlet pipe connected to a concentrated water outlet of a fresh water generating cartridge. A timer controls opening and closing of the flushing valve. The flushing valve is periodically opened during interruption of fresh water generation work with the fresh water generating cartridge or during fresh water generation work, or opened simultaneously with interruption of fresh water generation work or when restarting fresh water generation work, for performing flushing. Thus, the linear velocity on the surface of a reverse osmosis membrane of the fresh water generating cartridge is increased and impurities remaining on the membrane surface are discharged from the fresh water generating cartridge.

19 Claims, 8 Drawing Sheets

FRESH WATER GENERATOR AND FRESH WATER GENERATING METHOD

BACKGROUND OF THE INVENTION

1. Field of the Invention

The present invention relates to a fresh water generator and a fresh water generating method for desalinating a target liquid containing residual chlorine by feeding the same to a fresh water generating cartridge having a reverse osmosis membrane.

2. Description of the Prior Art

When desalinating a target liquid (hereinafter referred to as raw water) such as service water or industrial water containing residual chlorine, a fresh water generator having a fresh water generating cartridge including a reverse osmosis membrane (RO membrane) separates the raw water into permeated water and concentrated water. In order to obtain permeated water in a necessary and sufficient flow rate in a fresh water generator having a limited scale, a permeated water storage tank is provided on the fresh water generator for storing unused permeated water therein or a pressure pump is provided on the fresh water generator for increasing the permeate flow rate per unit membrane area.

FIG. 8 is a block diagram showing an exemplary conventional fresh water generator having a pressure pump 100.

The fresh water generator shown in FIG. 8 employs the pressure pump 100 and a fresh water generating cartridge 4 for desalination. The fresh water generating cartridge 4 includes a reverse osmosis membrane. The reverse osmosis membrane is reduced in durability when exposed to chlorine for a long time, and hence an active carbon cartridge 2 is employed for pretreatment in order to remove residual chlorine contained in raw water.

The raw water is fed to the active carbon cartridge 2 through a raw water feed pipe 1. The pressure pump 100 feeds the water permeating the active carbon cartridge 2 as pretreated water to the fresh water generating cartridge 4 through a pretreated water feed pipe 3. The fresh water generating cartridge 4 having the reverse osmosis membrane separates the pretreated water into permeated water and concentrated water. The separated permeated water is taken out from the fresh water generating cartridge 4 as treated water through a permeated water outlet pipe 5. On the other hand, the concentrated water is discharged from the fresh water generating cartridge 4 through a concentrated water discharge pipe 7. The concentrated water discharge pipe 7 is provided with a pressure regulating valve 6, for suppressing the concentrate flow rate. Thus, permeation through the membrane is prompted in the fresh water generating cartridge 4.

However, the aforementioned fresh water generator requires a driver (not shown) such as a motor or an engine for driving the pressure pump 100 and a controller (not shown) for controlling the driver. Thus, the fresh water generating cost as well as the price of the fresh water generator increase. Further, noise generated in the pressure pump 100 and the driver results in a problem.

When the pretreated water is fed to the fresh water generating cartridge 4 without employing the pressure pump 100, a sufficient linear velocity cannot be obtained on the surface of the reverse osmosis membrane of the fresh water generating cartridge 4 and hence contaminants such as impurities adhere to the membrane surface. When such a fresh water generator is continuously operated for a long time, the performance of the reverse osmosis membrane of the fresh water generating cartridge 4 is reduced to disadvantageously deteriorate the quality of the obtained permeated water and reduce the permeate flow rate over time.

SUMMARY OF THE INVENTION

An object of the present invention is to provide a fresh water generator and a fresh water generating method which can be reliably operated at a low cost over a long time with no problem of noise.

The inventor has made various experiments and deep study for desalinating a target liquid without employing a pressure pump while suppressing propagation of bacteria, to find out that it is possible to desalinate a target liquid having a pressure of not more than 2 $kgf/cm^2$ by feeding the same to a fresh water generating cartridge having a reverse osmosis membrane without employing a pressure pump when employing a reverse osmosis membrane having a rejection of at least 95% for an NaCl aqueous solution of 0.05% in concentration and a permeate flow rate of at least 0.1 $m^3/m^2 \cdot day \cdot kgf/cm^2$.

The inventor has found out that a practical permeate flow rate can be obtained over a long time by providing a flushing device on a fresh water generator. The inventor has proposed the present invention on the basis of such recognition.

A fresh water generator according to an aspect of the present invention comprises a freshwater generating cartridge, including a reverse osmosis membrane, for desalinating a target liquid, a feed system feeding the target liquid having a prescribed pressure to the fresh water generating cartridge without through a step-up device stepping up the pressure of the target liquid and a flushing device flushing the reverse osmosis membrane of the fresh water generating cartridge.

The term "flushing" indicates an operation of washing the surface of a separation membrane with a water stream.

In this fresh water generator, the target liquid having a prescribed pressure is fed to the fresh water generating cartridge having the reverse osmosis membrane by the feed system and desalinated. The flushing device flushes the reverse osmosis membrane of the fresh water generating cartridge so that impurities remaining on the surface of the reverse osmosis membrane of the fresh water generating cartridge can be discharged from the fresh water generating cartridge.

In the fresh water generator, the target liquid having a prescribed pressure is fed to the fresh water generating cartridge in a non-powered manner without through a pressure pump serving as a step-up device, whereby neither a driver for driving the pressure pump nor a controller for controlling the driver is necessary. Thus, the fresh water generating cost is reduced while increase of the price of the fresh water generator is suppressed. Further, no problem of noise is caused by any pressure pump or driver. In addition, the fresh water generator requiring no pressure pump, no driver and no controller is miniaturized and no electric charge is required.

The prescribed pressure may be at least 0.3 $kgf/cm^2$ and not more than 3 $kgf/cm^2$. In this case, desalination can be performed without employing a pressure pump.

The flushing device may periodically perform a flushing operation. Thus, impurities remaining on the surface of the reverse osmosis membrane of the fresh water generating cartridge can be periodically discharged from the fresh water generating cartridge.

The flushing device may perform the flushing operation when fresh water generation work with the fresh water generating cartridge is started. Thus, impurities such as fungi generated and deposited in the fresh water generating cartridge during stoppage of fresh water generation work can be discharged from the fresh water generating cartridge.

The flushing device may perform the flushing operation during fresh water generation work with the fresh water generating cartridge. Thus, impurities remaining on the surface of the reverse osmosis membrane of the fresh water generating cartridge during fresh water generation work can be discharged from the fresh water generating cartridge. In this case, flushing may be periodically or non-periodically performed during fresh water generation work.

The flushing device may perform the flushing operation simultaneously with stoppage of fresh water generation work with the fresh water generating cartridge. Thus, impurities remaining on the surface of the reverse osmosis membrane of the fresh water generating cartridge during fresh water generation work can be discharged from the fresh water generating cartridge.

The flushing device may perform the flushing operation during stoppage of fresh water generation work with the fresh water generating cartridge. Thus, impurities such as fungi generated and deposited in the fresh water generating cartridge during stoppage of fresh water generation work can be discharged from the fresh water generating cartridge.

The flushing device may be a flushing valve stored in the fresh water generating cartridge. Alternatively, the flushing device may be a flushing valve provided in a concentrated liquid path of the fresh water generating cartridge. In this case, the concentrate flow rate is increased by opening the flushing valve to increase the linear velocity on the surface of the reverse osmosis membrane of the fresh water generating cartridge. Thus, impurities remaining on the surface of the reverse osmosis membrane are discharged from the fresh water generating cartridge.

The flushing device may include an automatic valve, and the fresh water generator may further comprise a controller controlling an opening and closing operation of the automatic valve. In this case, the controller automatically controls the opening and closing operation of the automatic valve.

The controller may control the automatic valve to open the automatic valve by a prescribed time at a prescribed time interval. Thus, the automatic valve is periodically and automatically opened for periodically flushing the fresh water generating cartridge. Consequently, impurities remaining on the surface of the reverse osmosis membrane are periodically discharged from the fresh water generating cartridge.

The ratio $b/a$ of the flow rate $b$ of the permeated liquid obtained from the fresh water generating cartridge to the flow rate $a$ of the target liquid fed to the fresh water generating cartridge may be so set that $b/a > 0.5$.

In desalination with the fresh water generating cartridge having the reverse osmosis membrane, the target liquid fed to the fresh water generating cartridge is separated into a permeated liquid from which impurities are removed and a concentrated liquid in which impurities are concentrated. In order to increase the linear velocity on the surface of the reverse osmosis membrane for maintaining the membrane performance, the permeate flow rate $b$ may be minimized so that the concentrate flow rate $(a-b)$ approaches the target liquid flow rate $a$. When the ratio $b/a$ of the permeate flow rate $b$ to the target liquid flow rate $a$ is minimized to 0.1 or 0.2, for example, the linear velocity on the surface of the reverse osmosis membrane is maintained in a state close to that on the inlet for the target liquid. However, the concentrated liquid is generally discarded and hence the flow rate $b$ of the essentially required permeated liquid is uneconomically reduced if the ratio $b/a$ of the permeate flow rate $b$ to the target liquid flow rate $a$ is at a low value.

In the fresh water generator according to the present invention, the membrane performance can be maintained by providing the flushing device, whereby the quality of the permeated liquid can be maintained even if the ratio $b/a$ of the permeate flow rate $b$ to the target liquid flow rate $a$ exceeds 0.5. Consequently, an economical permeate flow rate can be obtained.

The fresh water generating cartridge may be formed by a plurality of fresh water generating cartridges connected in parallel and/or in series with each other. In this case, a large volume of permeated liquid can be obtained while preventing deterioration of the quality of the permeated liquid and reduction of the permeate flow rate.

If a plurality of fresh water generating cartridges are provided in parallel or in series with each other, the flushing valve may be stored in each fresh water generating cartridge or may be provided on the concentrated liquid path of each fresh water generating cartridge. Alternatively, the flushing valve may be provided on the rearmost one of connected portions between the concentrated liquid paths of the plurality of fresh water generating cartridges. Further, a prescribed number of fresh water generating cartridges arranged in parallel or in series with each other with a flushing valve provided on the rearmost one of connected portions between the concentrated liquid paths thereof may be integrated into a unit so that a plurality of such units are arranged in parallel or in series with each other.

The fresh water generator may be provided with a permeated liquid outlet path taking out a permeated liquid obtained from the fresh water generating cartridge and a permeated liquid discharge path discharging the permeated liquid. In this case, the permeated liquid taken out from the permeated liquid outlet path is employed for various applications as desalinated water. On the other hand, the permeated liquid discharged from the permeated liquid discharge path is not used but discharged as waste water.

In the fresh water generator thus provided with the permeated liquid discharge path, impurities deposited in the fresh water generating cartridge can be discharged from the fresh water generating cartridge through the permeated liquid discharge path along with the permeated liquid. The permeated liquid containing a large amount of impurities is discharged through the permeated liquid discharge path and hence only a permeated liquid having high quality is taken out from the permeated liquid outlet path. Therefore, the permeated liquid taken out from the permeated liquid outlet path is prevented from contamination with impurities and deterioration of quality.

The permeated liquid may be periodically discharged through the permeated liquid discharge path. Thus, impurities deposited in the fresh water generating cartridge can be periodically discharged from the fresh water generating cartridge through the permeated liquid discharge path along with the permeated liquid.

The permeated liquid may be discharged through the permeated liquid discharge path when fresh water generation work with the fresh water generating cartridge is started. Alternatively, the permeated liquid may be discharged through the permeated liquid discharge path during stoppage of fresh water generation work with the fresh water generating cartridge. In this case, impurities deposited in the fresh water generating cartridge during stoppage of fresh water generation work can be discharged from the fresh water generating cartridge through the permeated liquid discharge path.

The reverse osmosis membrane may have a performance of a rejection of at least 95% for an NaCl aqueous solution of 0.05% in concentration and a permeate flow rate of at least 0.1 $m^3/m^2 \cdot day \cdot kgf/cm^2$. In this case, the target liquid having a prescribed pressure can be fed to the fresh water generating cartridge without employing a pressurizer for readily performing desalination.

The fresh water generator may further comprise a pretreater provided in the preceding stage to the fresh water generating cartridge for removing residual chlorine contained in the target liquid. In this case, the target liquid is fed to the pretreater in a non-powered manner without through a pressure pump serving as a step-up device, so that residual chlorine contained in the target liquid is removed. Thus, the reverse osmosis membrane of the fresh water generating cartridge is prevented from damage caused by residual chlorine contained in the target liquid, and durability of the reverse osmosis membrane can be improved.

A fresh water generating method according to another aspect of the present invention comprises steps of feeding a target liquid having a prescribed pressure to a fresh water generating cartridge including a reverse osmosis membrane without through a step-up device stepping up the pressure, and flushing the reverse osmosis membrane of the fresh water generating cartridge at prescribed timing.

In this fresh water generating method, the target liquid having a prescribed pressure is fed to the fresh water generating cartridge including the reverse osmosis membrane and desalinated.

In this fresh water generating method, the target liquid having a prescribed pressure is fed to the fresh water generating cartridge in a non-powered manner without employing a pressure pump as a step-up device, whereby neither a driver for driving the pressure pump nor a controller for controlling the driver is required. Therefore, the fresh water generating cost is reduced and increase of the price of a fresh water generator is suppressed. Further, no problem of noise is caused by any pressure pump or driver.

Further, impurities remaining on the surface of the reverse osmosis membrane of the fresh water generating cartridge can be discharged from the fresh water generating cartridge by flushing the reverse osmosis membrane of the fresh water generating cartridge at prescribed timing. Consequently, it is possible to prevent deterioration of the quality of a permeated liquid in a short period and reduction of the permeate flow rate over time caused by an insufficient linear velocity on the surface of the reverse osmosis membrane.

The fresh water generating method may further comprise a step of discharging the permeated liquid obtained from the fresh water generating cartridge through a permeated liquid discharge path at prescribed timing. In this case, impurities deposited in the fresh water generating cartridge and on the outlet for the permeated liquid can be discharged from the fresh water generating cartridge along with the permeated liquid. The permeated liquid containing a large amount of impurities is discharged through the permeated liquid discharge path, and hence no discharged impurities are mixed into the permeated liquid taken out from the permeated liquid outlet path. Therefore, the permeated liquid is prevented from deterioration of quality and a permeated liquid having high quality can be obtained.

The fresh water generating method may further comprise a step of applying the permeated liquid obtained from the fresh water generating cartridge to wash water, soft water for a boiler, soft water for preparing food, agricultural water for hydroponics, pure water for a laboratory, water for a humidifier or potable water.

The fresh water generating method may further comprise a step of feeding the permeated liquid obtained from the fresh water generating cartridge to an ion exchanger or a continuous electric regenerative ion exchanger. In this case, purity of the permeated liquid is further improved by the ion exchanger or the continuous electric regenerative ion exchanger, whereby extrapure water is obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
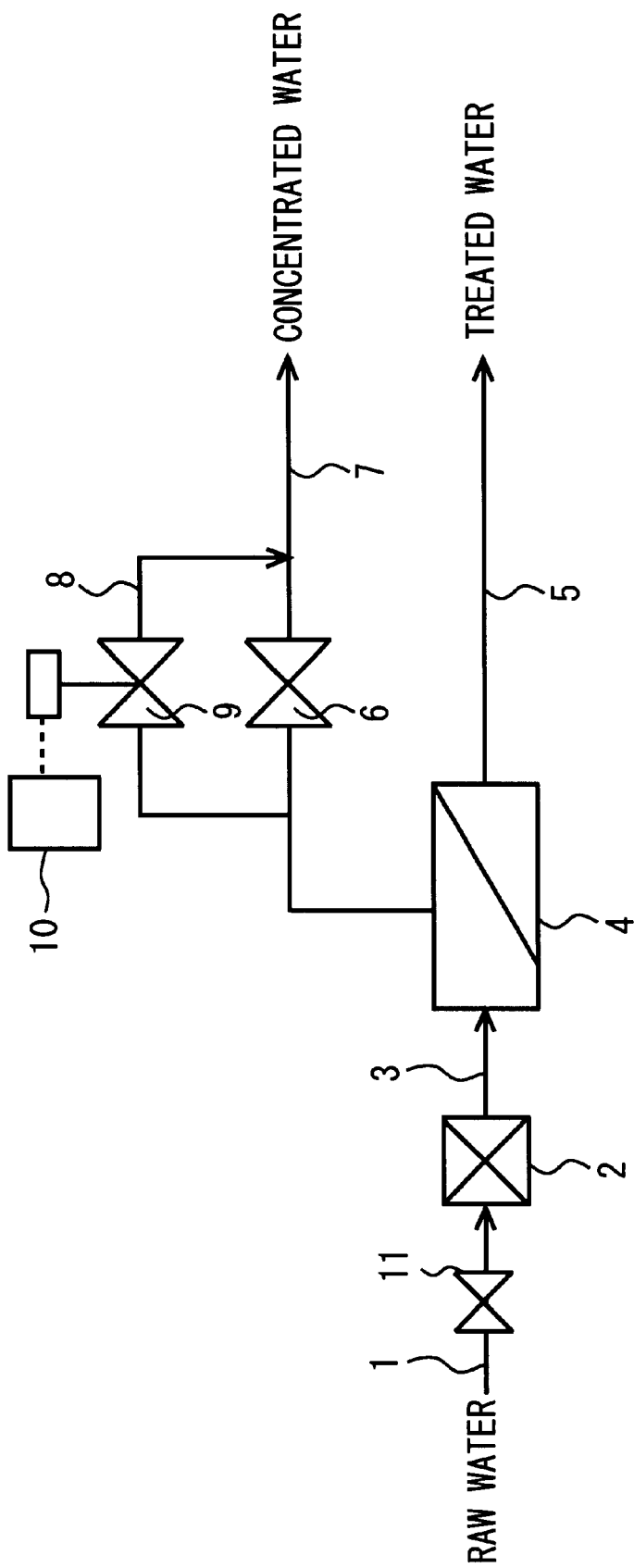
FIG. 1 is a block diagram showing a fresh water generator according to a first embodiment of the present invention.

FIG. 1 is a block diagram showing a fresh water generator according to a first embodiment of the present invention.

The fresh water generator shown in FIG. 1 employs an active carbon cartridge 2 for pretreatment and a fresh water generating cartridge 4 for desalination.

A raw water feed pipe 1 is connected to a raw water inlet of the active carbon cartridge 2 through a water feed valve 11. A permeated water outlet of the active carbon cartridge 2 is connected to a raw water inlet of the fresh water generating cartridge 4 through a pretreated water feed pipe 3. The water feed valve 11 may be an automatic valve. In this case, the water feed valve 11 and the raw water feed pipe 1 correspond to the feed system. A permeated water outlet pipe 5 is connected to a permeated water outlet of the fresh water generating cartridge 4, while a concentrated water outlet pipe 7 is connected to a concentrated water outlet thereof.

A pressure regulating valve 6 is inserted in the concentrated water outlet pipe 7, and a flushing valve 9 is connected in parallel with the pressure regulating valve 6 through a wash water pipe 8. The flushing valve 9 is formed by an automatic valve.

A timer 10 controls an opening and closing operation of the flushing valve 9. The flushing valve 9 and the timer 10 are employed for washing the fresh water generating cartridge 4. The timer 10 may also control an opening and closing operation of the water feed valve 11 simultaneously with or independently of the flushing valve 9.

In this embodiment, the raw water feed pipe 1 and the water feed valve 11 correspond to the feed system. The wash water pipe 8 and the flushing valve 9 correspond to the flushing device. Further, the timer 10 corresponds to the controller, and the permeated water outlet pipe 5 corresponds to the permeated liquid outlet path.

A reverse osmosis membrane module, for example, is employed as the fresh water generating cartridge 4. The reverse osmosis membrane module is formed by charging a reverse osmosis membrane spiral wound type element. In this embodiment, a reverse osmosis membrane module having a rejection of at least 95% for an NaCl aqueous solution of 0.05% in concentration and a permeate flow rate of at least 0.1 $m^3/m^2 \cdot day \cdot kgf/cm^2$ is employed.

Assuming that Cf represents the concentration of a target solute in feed water and Cp represents the concentration of the target solute in permeated water, the rejection R (%) is defined as follows:

$$R(\%) = (1 - Cp/Cf) \times 100 \quad (1)$$

The permeate flow rate in such a reverse osmosis membrane module is extremely larger than that in a reverse osmosis membrane module employed for general membrane separation. In the reverse osmosis membrane module employed for the fresh water generating cartridge 4, the rejection for an NaCl aqueous solution of 0.05% in concentration is at least 95% under conditions of a water temperature of 25° C. and an operation pressure of 7.5 $kgf/cm^2$, for example, and the permeate flow rate is at least 0.8 $m^3/m^2 \cdot day$. In the reverse osmosis membrane module employed for general membrane separation, on the other hand, the rejection for an NaCl aqueous solution of 0.05% in concentration is at least 95%, and the permeate flow rate is not more than 0.6 $m^3/m^2 \cdot day$.

Pretreatment and desalination in the fresh water generator shown in FIG. 1 are now described. In pretreatment and desalination, the water feed valve 11 is opened while the flushing valve 9 is closed.

Raw water is prepared from water such as service water or industrial water fed with a prescribed pressure or well water having a pressure resulting from a draw pump.

In pretreatment, the raw water fed by the raw water feed pipe 1 is fed into the active carbon cartridge 2. The active carbon cartridge 2 removes residual chlorine contained in the fed raw water. Water permeating the active carbon cartridge 2 is fed into the fresh water generating cartridge 4 through the pretreated water feed pipe 3 as pretreated water.

The pretreated water is desalinated by the fresh water generating cartridge 4 and separated into permeated water from which impurities are removed and concentrated water in which impurities are concentrated. The permeated water is discharged from the fresh water generating cartridge 4 as treated water through the permeated water outlet pipe 5 connected with the permeated water outlet of the fresh water generating cartridge 4. The concentrated water is discharged from the fresh water generating cartridge 4 through the concentrated water outlet pipe 7 connected with the concentrated water outlet of the fresh water generating cartridge 4.

The pressure regulating valve 6 provided on the concentrated water outlet pipe 7 is so set that the concentrate flow rate is below a prescribed level. Thus, the concentrate flow rate is suppressed while the permeate flow rate is increased.

The pressure regulating valve 6 is so set that the ratio b/a of the flow rate b of the permeated water obtained from the fresh water generating cartridge 4 to the flow rate a of the raw water fed to the fresh water generating cartridge 4 is greater than 0.5 (b/a>0.5). In this case, the permeated water is efficiently and economically obtained with a recovery higher than 50% with respect to the fed raw water.

In the aforementioned fresh water generator, raw water having a pressure of at least 0.3 $kgf/cm^2$ and not more than 3 $kgf/cm^2$ can be fed to the fresh water generating cartridge 4 in a non-powered manner without employing a pressure pump, to be efficiently desalinated.

Washing of the fresh water generating cartridge 4 is now described. In order to wash the fresh water generating cartridge 4, the following flushing is performed:

In washing, the water feed valve 11 is opened to feed raw water to the fresh water generating cartridge 4 while the flushing valve 9 provided on the wash water pipe 8 is opened. Thus, the concentrated water, the flow rate of which is suppressed by the pressure regulating valve 6 in the aforementioned desalination, is discharged through the wash water pipe 8 in a large volume. Thus, the linear velocity on the surface of the reverse osmosis membrane of the fresh water generating cartridge 4 is increased so that impurities remaining on the membrane surface can be discharged from the fresh water generating cartridge 4. Referring to FIG. 1, the timer 10 controls the flushing valve 9 to automatically open the flushing valve 9 by a prescribed time at a prescribed time interval.

For example, the timer 10 may be set to automatically open the flushing valve 9 for a prescribed time when restarting interrupted fresh water generation work (when restarting operation of the fresh water generator). In this case, flushing is performed by opening the water feed valve 11 and the flushing valve 9 when restarting operation of the fresh water generator, and thereafter the flushing valve 9 is closed for performing ordinary operation. In this case, operation of the fresh water generator may be restarted when turning on a main power source for the fresh water generator for operating a control circuit or when turning on a driving switch after turning on the main power source. The control circuit, including the timer 10 shown in FIG. 1, controls the water feed valve 11, the flushing valve 9 and the remaining automatic valves. The driving switch is employed for instructing the control circuit to start operation. A stop switch instructs the control circuit to stop operation.

Alternatively, the timer 10 may be set to automatically open the flushing valve 9 by a prescribed time at a prescribed time interval during interruption of fresh water generation work (during shutdown of fresh water generator). In this case, the water feed valve 11 is opened simultaneously with the flushing valve 9, for performing flushing.

If the flushing valve 9 is opened when restarting operation of the fresh water generator or the flushing valve 9 is periodically opened during shutdown of the fresh water generator, contaminants such as fungi generated and deposited in the fresh water generating cartridge 4 and impurities remaining on the membrane surface during shutdown of the fresh water generator can be discharged from the fresh water generating cartridge 4 by flushing.

In addition to the above, the flushing valve 9 may be periodically opened during operation of the fresh water generator. Alternatively, the flushing valve 9 may be opened simultaneously with shutdown of the fresh water generator for performing flushing and thereafter closed for stopping operation. In this case, contaminants such as fungi generated and deposited in the fresh water generating cartridge 4 and impurities remaining on the membrane surface during operation of the fresh water generator can be discharged from the fresh water generating cartridge 4 by flushing.

Further, the flushing valve 9 may be opened when the quality of the permeated water is deteriorated during operation of the fresh water generator. Also when the flushing valve 9 is non-periodically opened during operation of the fresh water generator in response to the degree of contamination of the fresh water generating cartridge, an effect similar to the above can be attained.

The performance of the reverse osmosis membrane of the fresh water generating cartridge 4 can be maintained by flushing in the aforementioned fresh water generator, whereby the quality of the permeated water is not deteriorated and the permeate flow rate is not reduced over time even if the linear velocity on the surface of the membrane in desalination is small. Therefore, the ratio b/a of the flow rate b of the permeated water obtained from the fresh water generating cartridge 4 to the flow rate a of the raw water fed to the fresh water generating cartridge 4 can be so set that b/a>0.5, as hereinabove described.

Figure 8:
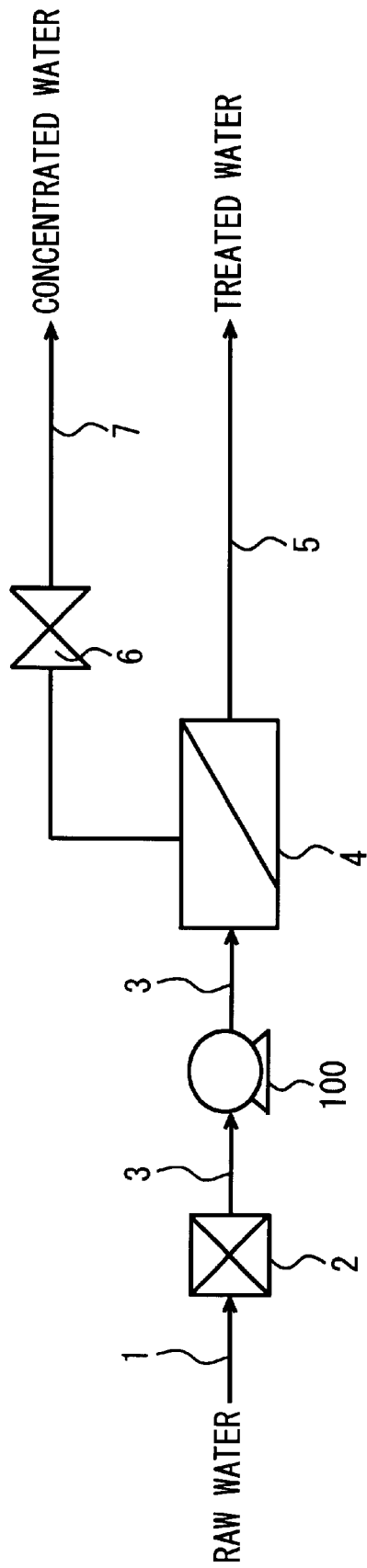
FIG. 8 is a block diagram showing an exemplary conventional fresh water generator having a pressure pump.

In the conventional fresh water generator shown in FIG. 8, on the other hand, the permeate flow rate b must be minimized so that the concentrate flow rate (a–b) approaches the raw water flow rate a for maintaining the membrane performance by increasing the linear velocity on the surface of the membrane in desalination with the fresh water generating cartridge 4. When the ratio b/a of the permeate flow rate b to the raw water flow rate a is minimized to 0.1 or 0.2, for example, it follows that the linear velocity on the surface of the reverse osmosis membrane is maintained in a state close to that on the inlet for the raw water. In general, however, the concentrated water is discharged as waste water and hence the target permeate flow rate b is uneconomically reduced if the ratio b/a of the permeate flow rate b to the raw water flow rate a is small.

In the fresh water generator shown in FIG. 1, on the other hand, the ratio b/a of the permeate flow rate b to the raw water flow rate a can be increased beyond 0.5, whereby an economical permeate flow rate can be obtained.

In the aforementioned fresh water generator requiring no pressure pump, as hereinabove described, the fresh water generating cost and the price of the fresh water generator can be suppressed while efficient desalination can be stably performed over a long period. Thus, fresh water can be generated at a low cost with no noise.

Figure 2:
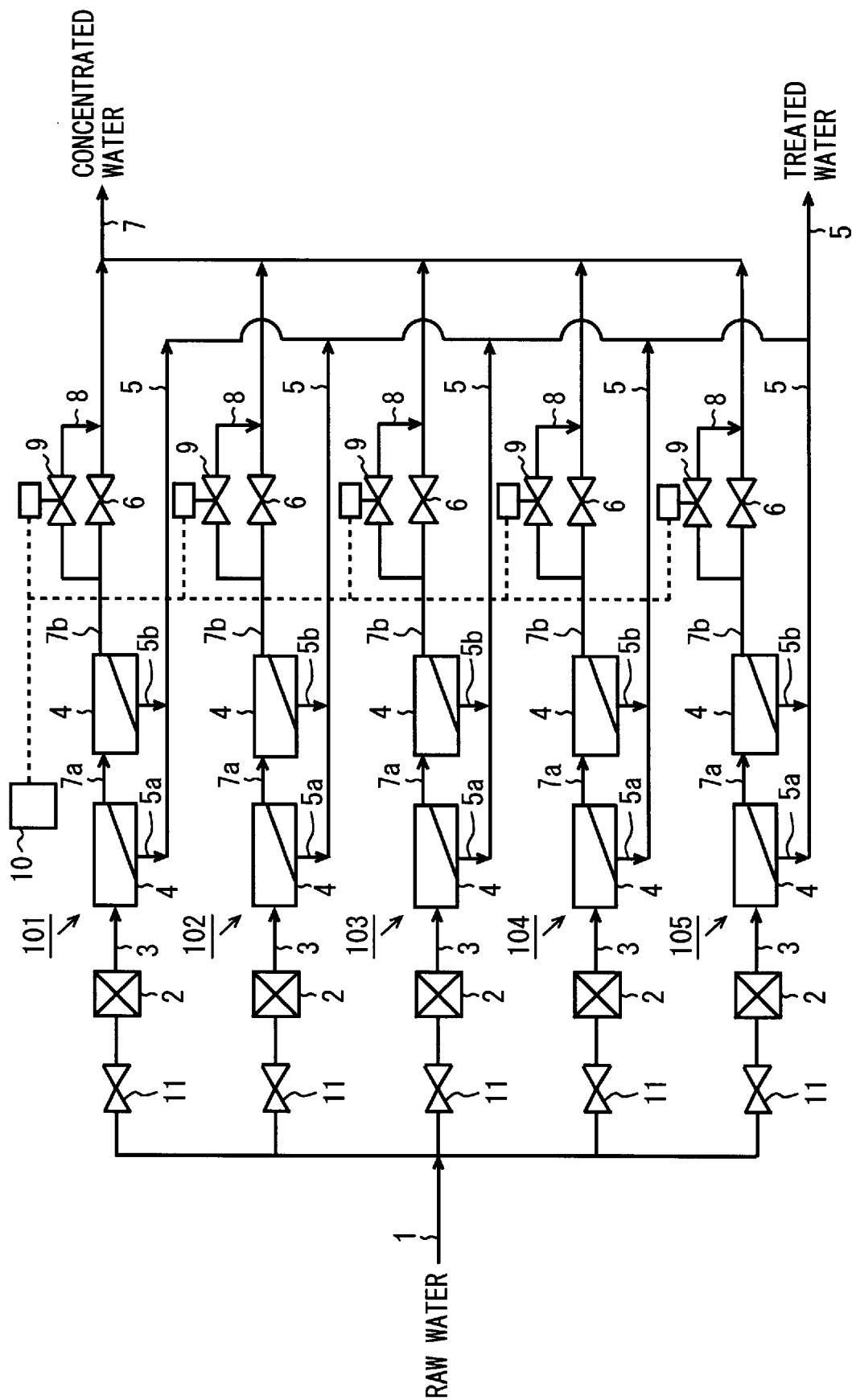
FIG. 2 is a block diagram showing a fresh water generator according to a second embodiment of the present invention.

FIG. 2 is a block diagram showing a fresh water generator according to a second embodiment of the present invention.

The fresh water generator shown in FIG. 2 employs active carbon cartridges 2 for pretreatment. Further, 10 fresh water generating cartridges 4 are employed for desalination.

Each pair of fresh water generating cartridges 4 are serially connected with each other to form a single unit, thereby forming five units 101 to 105. The five units 101 to 105 are arranged in parallel with each other.

A raw water feed pipe 1 is connected to raw water inlets of the preceding stage fresh water generating cartridges 4 of the units 101 to 105 through water feed valves 11, the active carbon cartridges 2 and pretreated water feed pipes 3 respectively. The water feed valves 11 are formed by automatic valves. Concentrated water outlets of the preceding stage fresh water generating cartridges 4 of the units 101 to 105 are connected to raw water inlets of the succeeding stage fresh water generating cartridges 4 of the units 101 to 105 through concentrated water outlet pipes 7a. Concentrated water outlets of the succeeding stage fresh water generating cartridges 4 of the units 101 to 105 are connected to a concentrated water outlet pipe 7 through concentrated water outlet pipes 7b. Pressure regulating valves 6 are inserted in the concentrated water outlet pipes 7b. Flushing valves 9 are connected in parallel with the pressure regulating valves 6 through wash water pipes 8. A common timer 10 independently or simultaneously controls opening and closing operations of the five flushing valves 9 and the five water feed valves 11 respectively. Permeated water outlets of the preceding and succeeding stage fresh water generating cartridges 4 of the units 101 to 105 are connected to a permeated water outlet pipe 5 through permeated water outlet pipes 5a and 5b respectively.

Each fresh water generating cartridge 4 is prepared from the reverse osmosis membrane module described with reference to the fresh water generator shown in FIG. 1.

Pretreatment and desalination in the fresh water generator shown in FIG. 2 are now described. In pretreatment and desalination, the water feed valves 11 are opened while the flushing valves 9 are closed. Raw water is prepared from that described with reference to the fresh water generator shown in FIG. 1.

In pretreatment, the raw water feed pipe 1 feeds raw water into each active carbon cartridge 2. Residual chlorine contained in the fed raw water is removed in the active carbon cartridge 2. Water permeating the active carbon cartridge 2 passes through each pretreated water feed pipe 3 as pretreated water and is fed into the preceding stage fresh water generating cartridge 4 of each of the units 101 to 105. The pretreated water is desalinated in the preceding stage fresh water generating cartridge 4 of each of the units 101 to 105 and separated into permeated water from which impurities are removed and concentrated water in which impurities are concentrated. The concentrated water passes through each concentrated water outlet pipe 7a connected to the concentrated water outlet of the preceding stage fresh water generating cartridge 4 of each of the units 101 to 105, and is fed into the succeeding stage fresh water generating cartridge 4 of each of the units 101 to 105. On the other hand, the permeated water passes through each permeated water outlet pipe 5a connected to the permeated water outlet of the preceding stage fresh water generating cartridge 4 of each of the units 101 to 105, further passes through the permeated water outlet pipe 5 and is discharged as treated water.

In the succeeding stage fresh water generating cartridge 4 of each of the units 101 to 105, the concentrated water from the preceding stage fresh water generating cartridge 4 is further desalinated and separated into permeated water from which impurities are removed and concentrated water in which impurities are concentrated. The permeated water passes through each permeated outlet pipe 5b connected to the permeated water outlet of the succeeding stage fresh water generating cartridge 4 of each of the units 101 to 105, further passes through the permeated water outlet pipe 5 and is discharged as treated water. On the other hand, the concentrated water passes through each concentrated water outlet pipe 7b connected to the concentrated water outlet of the succeeding stage fresh water generating cartridge 4 of each of the units 101 to 105, further passes through the concentrated water outlet pipe 7 and is discharged. The pressure regulating valve 6 provided on each concentrated water outlet pipe 7b is so set that the flow rate of the concentrated water from the preceding and succeeding stage fresh water generating cartridges 4 of each of the units 101 to 105 is below a prescribed level. Thus, the concentrated water flow rate is suppressed and the permeate flow rate is increased.

Each pressure regulating valve 6 is so set that the ratio b/a of the flow rate b of the permeated water obtained from the preceding and succeeding stage fresh water generating cartridges 4 of each of the units 101 to 105 to the flow rate a of the raw water fed to the preceding stage fresh water generating cartridge is greater than 0.5 (b/a>0.5). In this case, the permeated water is efficiently and economically obtained with a recovery higher than 50%.

In the aforementioned fresh water generator, raw water having a pressure of not more than 3 kgf/cm$^2$ can be fed to the preceding and succeeding stage fresh water generating cartridges 4 of the units 101 to 105 in a non-powered manner without employing a pressure pump, to be efficiently desalinated.

Washing of the preceding and succeeding stage fresh water generating cartridges 4 of the units 101 to 105 is now described. The fresh water generating cartridges 4 are washed by flushing.

In washing, the water feed valves 11 are opened for feeding raw water to the preceding stage fresh water generating cartridges of the units 101 to 105 while the flushing valves 9 provided on the wash water pipes 8 are simultaneously opened. Thus, the concentrated water, the flow rate of which has been suppressed by the pressure regulating valves 6 in the aforementioned desalination, is discharged through the wash water pipes 8 and the concentrated water outlet pipe 7 in a large volume. Thus, the linear velocity on the surfaces of the reverse osmosis membranes of the preceding and succeeding stage fresh water generating cartridges 4 of the units 101 to 105 is increased so that impurities remaining on the membrane surfaces can be discharged from the preceding and succeeding stage fresh water generating cartridges 4. Referring to FIG. 2, the common timer 10 controls the flushing valves 9 to simultaneously open the flushing valves 9 by a prescribed time at a prescribed time interval.

For example, the timer 10 may be set to automatically open the flushing valves 9 for a prescribed time when restarting interrupted fresh water generation work (when restarting operation of the fresh water generator). Thus, flushing is performed by opening the water feed valves 11 and the flushing valves 9 when restarting operation of the fresh water generator, and thereafter the flushing valves 9 are closed for performing ordinary operation. Alternatively, the timer 10 may be set to automatically open the flushing valves 9 by a prescribed time at a prescribed time interval during interruption of fresh water generation work (during shutdown of the fresh water generator). In this case, the water feed valves 11 are opened simultaneously with the flushing valves 9, for performing flushing.

If the flushing valves 9 are opened when restarting operation or the flushing valves 9 are periodically opened during shutdown, contaminants such as fungi generated and deposited in the fresh water generating cartridges 4 and impurities remaining on the membrane surfaces during shutdown of the fresh water generator can be discharged from the fresh water generating cartridges 4 by flushing.

In addition to the above, the flushing valves 9 may be periodically opened during operation of the fresh water generator. Alternatively, the flushing valves 9 may be opened simultaneously with shutdown of the fresh water generator and thereafter closed for stopping operation. In this case, contaminants such as fungi generated and deposited in the fresh water generating cartridges 4 and impurities remaining on the membrane surfaces during operation of the fresh water generator can be discharged from the fresh water generating cartridges 4 by flushing. Further, the flushing valves 9 may be opened when the quality of the permeated water is deteriorated during operation of the fresh water generator. Also when the flushing valves 9 are non-periodically opened during operation of the fresh water generator, an effect similar to the above can be attained.

In the aforementioned fresh water generator, the performance of the reverse osmosis membranes of the preceding and succeeding stage fresh water generating cartridges 4 of the units 101 to 105 can be maintained by flushing, whereby the quality of the permeated water is not deteriorated and the permeate flow rate is not reduced over time even if the linear velocity on the membrane surfaces in desalination is small. Therefore, the ratio b/a of the flow rate b of the permeated water obtained from the preceding and succeeding stage fresh water generating cartridges 4 of the units 101 to 105 to the flow rate a of the raw water fed to the preceding stage fresh water generating cartridges 4 can be so set that b/a>0.5.

In the aforementioned fresh water generator requiring no pressure pump, as hereinabove described, the fresh water generating cost and the price of the fresh water generator can be suppressed while efficient desalination can be stably performed over a long period. Thus, fresh water can be generated at a low cost with no noise.

FIG. 2 shows an exemplary structure of the fresh water generator provided with a plurality of fresh water generating cartridges 4, and another structure is also employable. When a plurality of fresh water generating cartridges 4 are provided in parallel or in series with each other, a flushing valve may be stored in each fresh water generating cartridge 4 or may be provided on the rearmost one of connected portions between concentrated liquid paths of the plurality of fresh water generating cartridges 4. Further, a prescribed number of fresh water generating cartridges 4 arranged in parallel or in series with each other with a flushing valve provided on the rearmost one of connected portions between the concentrated liquid paths thereof may be integrated into a unit so that a plurality of such units are arranged in parallel or in series with each other.

Figure 3:
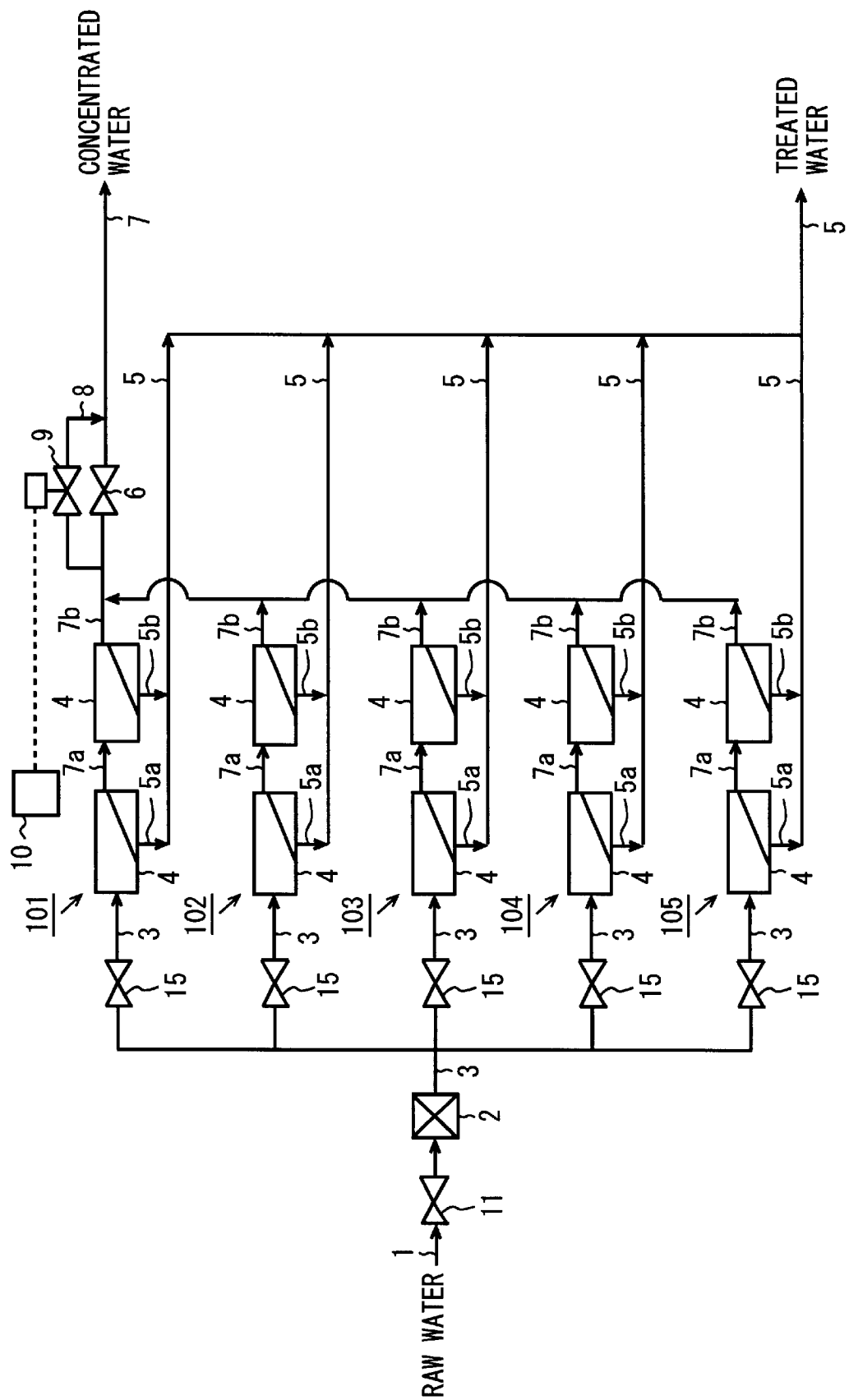
FIG. 3 is a block diagram showing a fresh water generator according to a third embodiment of the present invention.
Figure 4:
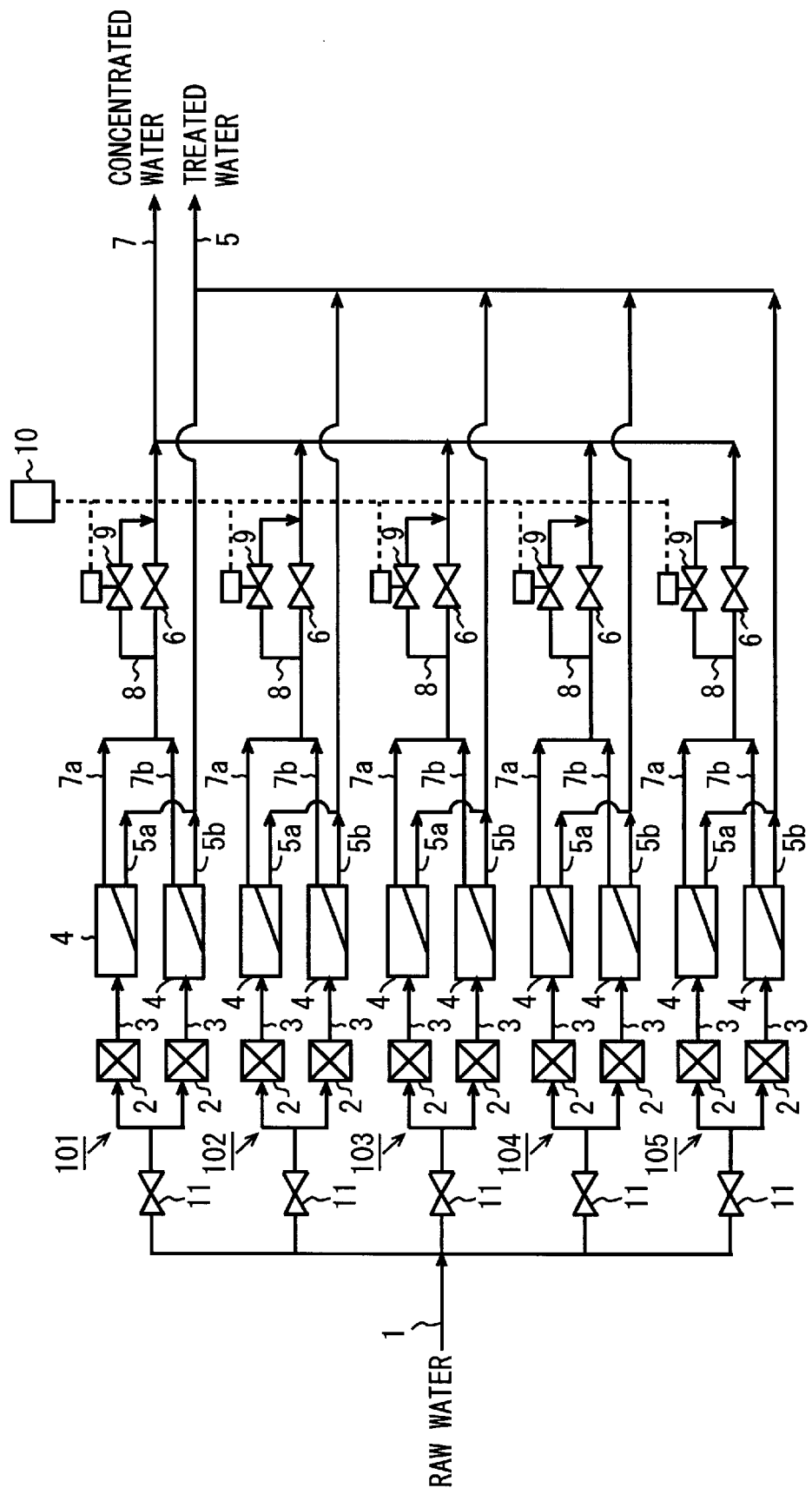
FIG. 4 is a block diagram showing a fresh water generator according to a fourth embodiment of the present invention.
Figure 5:
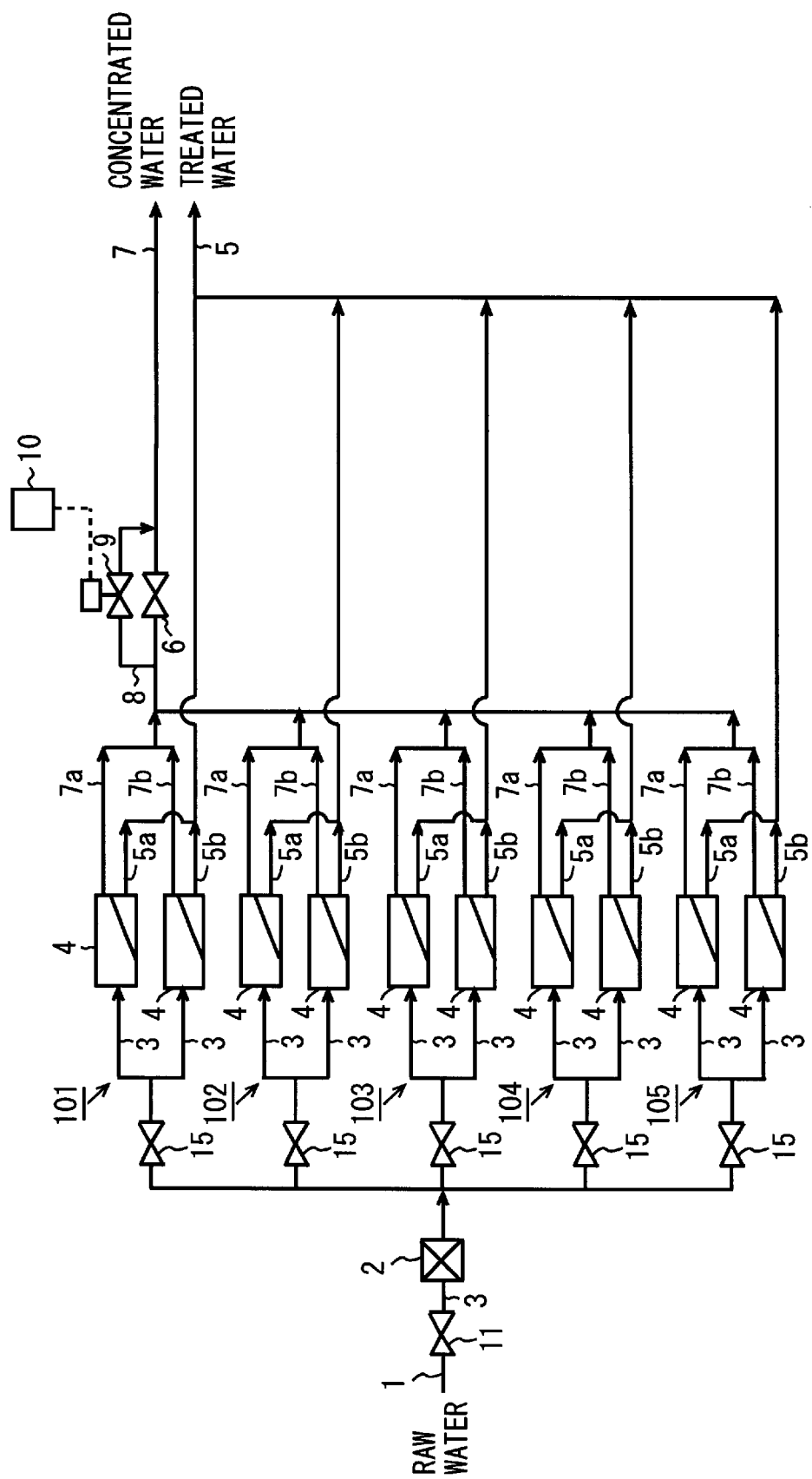
FIG. 5 is a block diagram showing a fresh water generator according to a fifth embodiment of the present invention.
Figure 6:
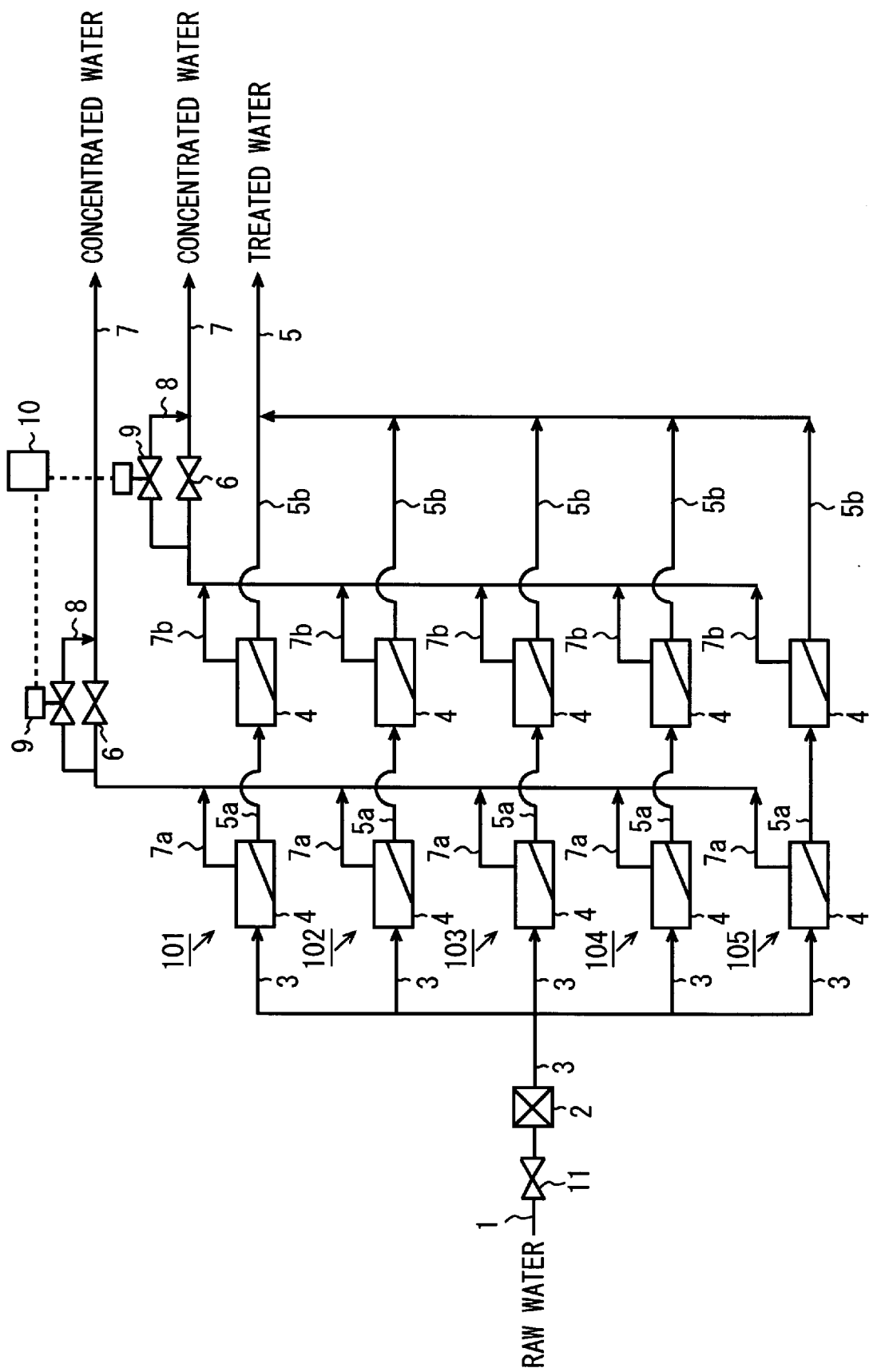
FIG. 6 is a block diagram showing a fresh water generator according to a sixth embodiment of the present invention.

As a fresh water generator according to a third embodiment of the present invention, raw water inlets of preceding stage fresh water generating cartridges 4 of five units 101 to 105 may be connected to a common active carbon cartridge 2 through opening/closing valves 15 respectively while a common pressure regulating valve 6 and a common flushing valve 9 may be connected to concentrated water outlets of succeeding stage fresh water generating cartridges 4 of the five units 101 to 105 as shown in FIG. 3, for example. As a fresh water generator according to a fourth embodiment of the present invention, two fresh water generating cartridges 4 of each of units 101 to 105 may be connected in parallel with each other so that raw water inlets of the two fresh water generating cartridges 4 connected in parallel are connected to a common raw water feed pipe 1 through active carbon cartridges 2 and a common water feed valve 11, as shown in FIG. 4. As a fresh water generator according to a fifth embodiment of the present invention, further, two fresh water generating cartridges 4 of each of units 101 to 105 may be connected in parallel with each other so that raw water outlets of the pairs of fresh water generating cartridges 4 connected in parallel are connected to a common active carbon cartridge 2 through opening/closing valves 15 while a common pressure regulating valve 6 and a common flushing valve 9 are connected to concentrated water outlets of the fresh water generating cartridges 4 of the five units 101 to 105, as shown in FIG. 5. As a fresh water generator according to a sixth embodiment of the present invention, a permeated water outlet pipe 5a of a preceding stage fresh water generating cartridge 4 may be connected to a raw water inlet of a succeeding stage fresh water generating cartridge 4 in each of units 101 to 105 so that the two fresh water generating cartridges 4 of each of the units 101 to 105 are connected in series with each other, raw water inlets of the preceding stage fresh water generating cartridges 4 of the five units 101 to 105 are connected to a common active carbon cartridge 2, a common pressure regulating valve 6 and a common flushing valve 9 are connected to concentrated water outlets of the preceding stage fresh water generating cartridges 4 of the five units 101 to 105, and another common pressure regulating valve 6 and another common flushing valve 9 are connected to concentrated water outlets of the succeeding stage fresh water generating cartridges 4 of the five units 101 to 105, as shown in FIG. 6.

Figure 7:
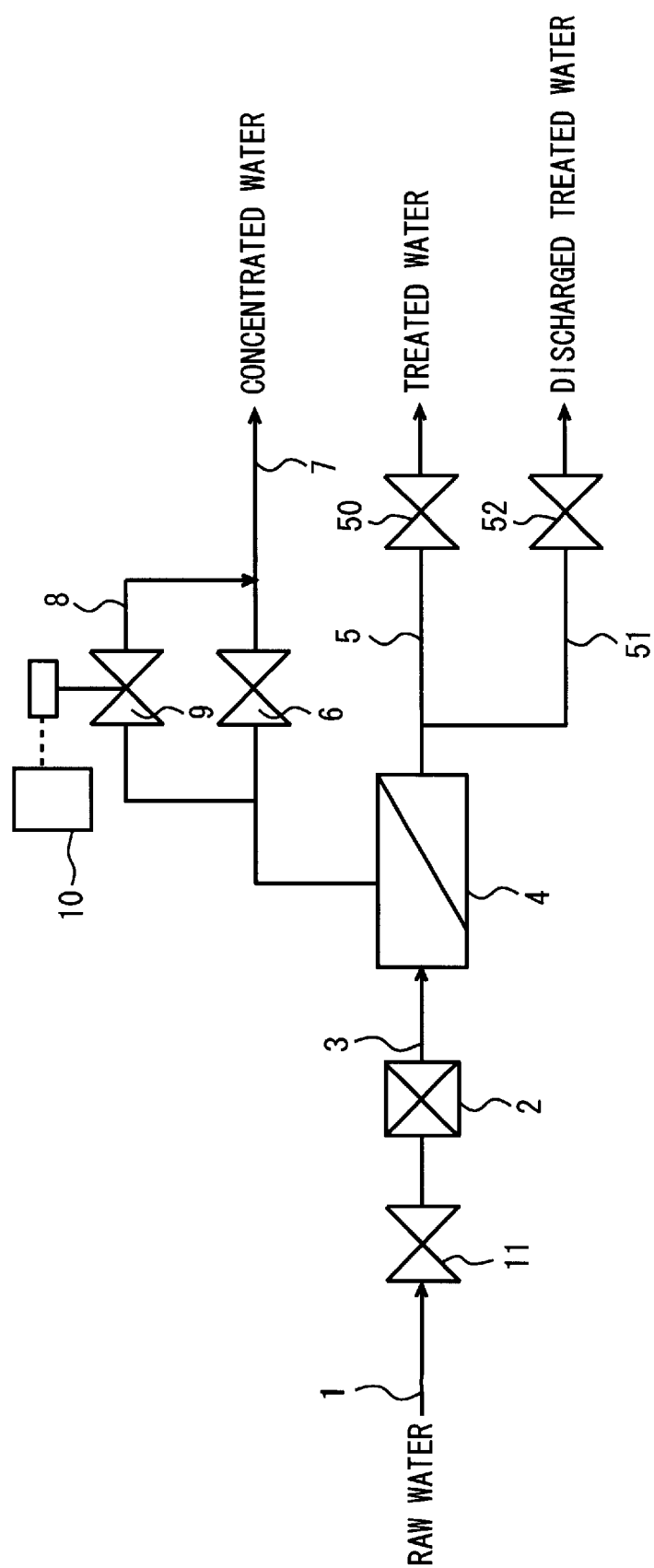
FIG. 7 is a block diagram showing a fresh water generator according to a seventh embodiment of the present invention.

FIG. 7 is a block diagram showing a fresh water generator according to a seventh embodiment of the present invention. The freshwater generator shown in FIG. 7 is similar in structure to the fresh water generator shown in FIG. 1, except the following points:

In the fresh water generator shown in FIG. 7, a permeated water discharge pipe 51 having a permeated water discharge valve 52 inserted therein is connected to the permeated water outlet pipe 5. A permeated water outlet valve 50 is inserted in the permeated water outlet pipe 5. In this case, the permeated water outlet valve 50 and the permeated water discharge valve 52 may be automatic valves, opening and closing operations of which may be independently or simultaneously controlled by a timer or the like respectively. In this embodiment, the permeated water discharge pipe 51 corresponds to the permeated liquid discharge path.

The fresh water generator shown in FIG. 7 performs pretreatment and desalination similarly to the fresh water generator shown in FIG. 1. In pretreatment and desalination, the permeated water outlet valve 50 of the permeated water outlet pipe 5 is opened while the permeated water discharge valve 52 of the permeated water discharge pipe 51 is closed.

In the aforementioned fresh water generator, raw water having a pressure of at least 0.3 $kgf/cm^2$ and not more than 3 $kgf/cm^2$ can be fed to a fresh water generating cartridge 4 in a non-powered manner without employing a pressure pump to be efficiently desalinated.

A pressure regulating valve 6 is so set that the ratio b/a of the flow rate b of permeated water obtained from the fresh water generating cartridge 4 to the flow rate a of raw water fed to the fresh water generating cartridge 4 is greater than 0.5 (b/a>0.5), whereby permeated water can be obtained with a recovery higher than 50% with respect to the fed raw water. Thus, the fresh water generator is efficient and economical.

In the aforementioned fresh water generator, flushing is performed through a wash water pipe 8 similarly to the fresh water generator shown in FIG. 1. Thus, impurities remaining on the surface of a reverse osmosis membrane of the fresh water generating cartridge 4 can be discharged from the fresh water generating cartridge 4.

In the aforementioned fresh water generator, the water feed valve 11 is opened while opening the permeated water discharge valve 52 and closing the permeated water outlet valve 50 when restarting interrupted fresh water generation work (when restarting operation of the fresh water generator). In this case, permeated water is discharged from the fresh water generating cartridge 4 through the permeated water discharge pipe 51. Thus, the permeated water discharge valve 52 is opened when restarting operation of the fresh water generator for discharging the permeated water, and thereafter the permeated water discharge valve 52 is closed while the permeated water outlet valve 51 is opened for performing ordinary operation.

Due to the aforementioned discharge of the permeated water, contaminants such as fungi generated and deposited in the fresh water generating cartridge 4 and the permeated water outlet pipe 5 during shutdown of the fresh water generator can be discharged through the permeate discharge pipe 51 along with the permeated water. Consequently, the contaminants can be removed from the fresh water generating cartridge 4 and the permeated water outlet pipe 5, while the permeated water taken out through the permeated water outlet pipe 5 can be prevented from mixture with the contaminants.

In the aforementioned fresh water generator, the performance of the reverse osmosis membrane of the fresh water generating cartridge 4 can be maintained by flushing, whereby the quality of the permeated water is not deteriorated even if the linear velocity on the membrane surface is small in desalination, and the permeate flow rate is not reduced over time. Therefore, the ratio b/a of the flow rate b of the permeated water obtained from the fresh water generating cartridge 4 to the flow rate a of the raw water fed to the fresh water generating cartridge 4 can be so set that b/a>0.5 as described above, and an economical permeate flow rate can be obtained.

In addition, contaminants can be discharged from the fresh water generating cartridge 4 and the permeated water outlet pipe 5 by the aforementioned discharge of the permeated water. Consequently, the performance of the reverse osmosis membrane of the fresh water generating cartridge 4 can be maintained while the permeated water is prevented from deterioration of quality.

Further, the fresh water generator requires no pressure pump, whereby the fresh water generating cost and the price of the fresh water generator can be suppressed while efficient desalination can be stably performed over a long period. Thus, fresh water can be generated at a low cost with no noise.

While the permeated water discharge valve 52 is opened when restarting operation of the fresh water generator in the above description, the water feed valve 11 may be periodically opened for feeding raw water while opening the permeate discharge valve 52 during shutdown of the freshwater generator. Also in this case, contaminants such as fungi generated and deposited in the fresh water generating cartridge 4 and the permeated water outlet pipe 5 during shutdown of the fresh water generator can be discharged.

While the aforementioned fresh water generator is formed by a single fresh water generating cartridge 4, the fresh water generator may alternatively have a plurality of such fresh water generating cartridges 4 provided in parallel or in series with each other.

When a plurality of fresh water generating cartridges 4 are provided in parallel or in series with each other, the permeated water discharge pipe 51 having the permeated water discharge valve 52 inserted therein is connected to the rearmost one of connected portions between permeated water outlet pipes 5 of the fresh water generating cartridges 4. Further, the permeated water outlet valve 50 is inserted in the permeated water outlet pipe 5 downstream the connected portion of the permeated water discharge pipe 51. In addition, a prescribed number of fresh water generating cartridges 4 arranged in parallel or in series with each other with the aforementioned permeated water discharge pipe 51, permeated water discharge valve 52 and permeated water outlet valve 50 provided on the rearmost one of the connected portions between the permeated water outlet pipes 5 may be integrated into a unit so that a plurality of such units are arranged in parallel or in series with each other. Also in this case, no pressure pump is required but the fresh water generating cost and the price of the fresh water generator can be suppressed and efficient desalination can be stably performed over a long period, similarly to the fresh water generator shown in FIG. 7. Thus, fresh water can be generated at a low cost with no noise.

The treated water obtained by each of the fresh water generators shown in FIGS. 1 to 7 may be applied to wash water. The wash water is employed for improving the washing effect and preventing generation of surface residues in drying after washing. The obtained treated water may be applied to soft water for a boiler, soft water for preparing food, agricultural water for hydroponics, pure water for a laboratory, water for a humidifier or potable water. Further, the treated water may be fed to an ion exchanger or a continuous electric regenerative ion exchanger. In this case, the purity of the treated water is further improved and hence extrapure water is obtained. The term "continuous electric regenerative ion exchanger" indicates an apparatus continuously performing ion exchange with an externally fed current for electrodialysis employing no ion exchange membrane or electrolysis employing an ion exchange membrane.

EXAMPLES

Fresh water generators of Examples 1 to 4 and comparative example were operated as follows, to desalinate raw water. The raw water was prepared from service water in Kusatsu City, Shiga Prefecture. Table 1 shows the characteristics of the service water.

TABLE 1

| Raw Water | Service Water, Kusatsu City, Shiga Pref. Water Temperature 22° C. Pressure 1 kgf/cm$^2$ Concentration of Residual Chlorine 0.5 mg/L Conductivity 150 μS/cm |
|---|---|

The fresh water generators of Examples 1 to 4 and comparative example were prepared from that shown in FIG. 1. A reverse osmosis membrane spiral wound type element LES90-D8 by Nitto Denko Corporation was employed for the fresh water generating cartridge 4. Table 2 shows the performance of this reverse osmosis membrane spiral would type element.

TABLE 2

| LES 90-D8 by Nitto Denko Corporation 8 inches | Membrane Area 37 m$^2$ 0.05% NaCl Aqueous Solution Rejection 98% Permeate Flow Rate 30 m$^3$/day (Water Temperature 25° C., Operating Pressure 5 kgf/cm$^2$) |
|---|---|

Example 1

The aforementioned service water was fed to the active carbon cartridge 2 at a flow rate of 6.5 L/min. for removing residual chlorine, and fresh water generation work was carried out in the fresh water generating cartridge 4. In this case, the flushing valve 9 was fully opened for 30 seconds once an hour during fresh water generation work (during operation of the fresh water generator), for performing flushing.

In Example 1, such fresh water generation work was continuously carried out.

Treated water obtained after one hour from starting operation exhibited conductivity of 10 μS/cm, hardness of not more than 1 mg/L and a silica content of not more than 1 mg/L. The permeate flow rate was 4.5 L/min. Treated water obtained after 500 hours from starting operation exhibited conductivity of 15 μS/cm, hardness of not more than 1 mg/L and a silica content of not more than 1 mg/L. The permeate flow rate was 4.2 L/min.

Example 2

The aforementioned service water was fed to the active carbon cartridge 2 at a flow rate of 6.5 L/min. for removing residual chlorine, and fresh water generation work was carried out in the fresh water generating cartridge 4 for 24 hours. In this case, the flushing valve 9 was fully opened for 30 seconds once an hour during fresh water generation work, for performing flushing. Thereafter the water feed valve 11 was closed to stop feeding the service water to the active carbon cartridge 2, and fresh water generation work was interrupted for 48 hours. During interruption of fresh water generation work (during shutdown of the fresh water generator), the flushing valve 9 and the water feed valve 11 were fully opened for 30 seconds once in four hours, for feeding service water to the fresh water generating cartridge 4 and performing flushing. After interrupting fresh water generation work for 48 hours, the flushing valve 9 was closed and the water feed valve 11 was opened for feeding service water to the active carbon cartridge 2 and restarting fresh water generation work.

In Example 2, such fresh water generation work and interruption of fresh water generation work were repeated.

Treated water obtained after one hour from starting operation exhibited conductivity of 10 μS/cm, hardness of not more than 1 mg/L and a silica content of not more than 1 mg/L. The permeate flow rate was 4.5 L/min. Treated water obtained after 500 hours from starting operation exhibited conductivity of 16 μS/cm, hardness of not more than 1 mg/L and a silica content of not more than 1 mg/L. The permeate flow rate was 4.1 L/min.

Example 3

The aforementioned service water was fed to the active carbon cartridge 2 at a flow rate of 6.5 L/min. for removing residual chlorine, and fresh water generation work was carried out in the fresh water generating cartridge 4 for 24 hours. In this case, the flushing valve 9 was fully opened for 30 seconds once an hour during fresh water generation work, for performing flushing. Thereafter the water feed valve 11 was closed to stop feeding the service water to the active carbon cartridge 2. In this case, the flushing valve 9 was fully opened for 30 seconds simultaneously with interruption of fresh water generation work (simultaneously with shutdown of the fresh water generator), for performing flushing. Thereafter the flushing valve 9 was closed, and fresh water generation work was interrupted for 3 hours. After interrupting fresh water generation work for 3 hours, the water feed valve 11 was opened for feeding service water to the active carbon cartridge 2 and restarting fresh water generation work.

In Example 3, such fresh water generation work and interruption of fresh water generation work were repeated.

Treated water obtained after one hour from starting operation exhibited conductivity of 10 μS/cm, hardness of not more than 1 mg/L and a silica content of not more than 1 mg/L. The permeate flow rate was 4.5 L/min. Treated water obtained after 500 hours from starting operation exhibited conductivity of 16 μS/cm, hardness of not more than 1 mg/L and a silica content of not more than 1 mg/L. The permeate flow rate was 4.2 L/min.

Example 4

The aforementioned service water was fed to the active carbon cartridge 2 at a flow rate of 6.5 L/min. for removing residual chlorine, and fresh water generation work was carried out in the fresh water generating cartridge 4 for 24 hours. In this case, the flushing valve 9 was fully opened for 30 seconds once an hour during fresh water generation work, for performing flushing. Thereafter the water feed valve 11 was closed to stop feeding the service water to the active carbon cartridge 2, and fresh water generation work was interrupted for 3 hours. After interrupting fresh water generation work for 3 hours, the water feed valve 11 was opened and the flushing valve 9 was fully opened for 30 seconds for performing flushing when restarting fresh water generation work (when restarting operation of the fresh water generator). Thereafter the flushing valve 9 was closed for carrying out ordinary fresh water generation work.

In Example 4, such fresh water generation work and interruption of fresh water generation work were repeated.

Treated water obtained after one hour from starting operation exhibited conductivity of 10 $\mu$S/cm, hardness of not more than 1 mg/L and a silica content of not more than 1 mg/L. The permeate flow rate was 4.5 L/min. Treated water obtained after 500 hours from starting operation exhibited conductivity of 16 $\mu$S/cm, hardness of not more than 1 mg/L and a silica content of not more than 1 mg/L. The permeate flow rate was 4.2 L/min.

Comparative Example

The aforementioned service water was fed to the active carbon cartridge 2 at a flow rate of 6.5 L/min. for removing residual chlorine, and fresh water generation work was carried out in the fresh water generating cartridge 4.

In comparative example, such fresh water generation work was continuously carried out.

Treated water obtained after one hour from starting operation exhibited conductivity of 10 $\mu$S/cm, hardness of not more than 1 mg/L and a silica content of not more than 1 mg/L. The permeate flow rate was 4.5 L/min. Treated water obtained after 500 hours from starting operation exhibited conductivity of 85 $\mu$S/cm, hardness of 6 mg/L and a silica content of 2 mg/L. The permeate flow rate was 2.5 L/min.

As shown in Examples 1 to 4, contaminants are removed from the fresh water generating cartridge 4 and hence high-quality permeated water can be obtained at a high permeate flow rate over a long time when periodically performing flushing during fresh water generation work or during stoppage of fresh water generation work or performing flushing simultaneously with interruption of fresh water generation work or when restarting fresh water generation work.

As shown in comparative example, on the other hand, contaminants are deposited in the fresh water generating cartridge 4 with the passage of the operation time when no flushing is performed. Thus, the quality of the obtained permeated water as well as the permeate flow rate are reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fresh water generator comprising:
    a fresh water generating cartridge, including a reverse osmosis membrane, for desalinating a target liquid;
    a feed system for feeding said target liquid having a prescribed pressure to said fresh water generating cartridge without step-up means for stepping up the pressure of said target liquid, wherein said prescribed pressure is at least 0.3 kgf/cm$^2$ and not more than 3 kgf/cm$^2$; and
    flushing means for flushing said reverse osmosis membrane of said fresh water generating cartridge;
    wherein said reverse osmosis membrane has a permeate flux of at least 0.1 m$^3$/m$^2$·day·kgf/cm$^2$ and a rejection performance of at least 95% for an NaCl aqueous solution of 0.05% concentration.

2. The fresh water generator in accordance with claim 1, wherein
    said flushing means is one which periodically performs a flushing operation.

3. The fresh water generator in accordance with claim 1, wherein
    said flushing means is one which performs a flushing operation when fresh water generation work with said fresh water generating cartridge is started.

4. The fresh water generator in accordance with claim 1, wherein
    said flushing means is one which performs a flushing operation during fresh water generation work with said fresh water generating cartridge.

5. The fresh water generator in accordance with claim 1, wherein
    said flushing means is one which performs a flushing operation simultaneously with stoppage of fresh water generation work with said fresh water generating cartridge.

6. The fresh water generator in accordance with claim 1, wherein
    said flushing means is one which performs a flushing operation during stoppage of fresh water generation work with said fresh water generating cartridge.

7. The fresh water generator in accordance with claim 1, wherein
    said flushing means includes a flushing valve.

8. The fresh water generator in accordance with claim 7, wherein
    said flushing valve includes an automatic valve,
    said fresh water generator further comprising a controller controlling an opening and closing operation of said automatic valve.

9. The fresh water generator in accordance with claim 8, wherein
    said controller controls said automatic valve to open said automatic valve by a prescribed time at a prescribed time interval.

10. The fresh water generator in accordance with claim 1, wherein
    said fresh water generating cartridge is formed by a plurality of fresh water generating cartridges connected in parallel and/or in series with each other.

11. The fresh water generator in accordance with claim 1, further comprising:
    a permeated liquid outlet path taking out a permeated liquid obtained from said fresh water generating cartridge, and
    a permeated liquid discharge path discharging said permeated liquid.

12. The fresh water generator in accordance with claim 11, wherein
    said permeated liquid is discharged through said permeated liquid discharge path when fresh water generation work with said fresh water generating cartridge is started.

13. The fresh water generator in accordance with claim 1, further comprising a pretreater provided in a preceding stage to said fresh water generating cartridge for removing residual chlorine in said target liquid.

14. A fresh water generator comprising:
   a fresh water generating cartridge, including a reverse osmosis membrane, for desalinating a target liquid;
   a feed system for feeding said target liquid having a prescribed pressure to said fresh water generating cartridge without a step-up means for stepping up the pressure of said target liquid; and
   flushing means for flushing said reverse osmosis membrane of said fresh water generating cartridge by allowing an intermittent increased flow of concentrated water from the membrane, said flow otherwise being suppressed by a pressure regulating valve:
   and means for maintaining the ratio b/a of the flow rate b of a permeated liquid obtained from said fresh water generating cartridge to the flow rate a of said target liquid fed to said fresh water generating cartridge at b/a >0.5.

15. A fresh water generating method comprising the steps of:
   feeding a target liquid having a prescribed pressure to a fresh water generating cartridge including a reverse osmosis membrane without step-up means for stepping up the pressure, wherein said prescribed pressure is at least 0.3 kgf/cm2 and not more than 3 kgf/cm2; and
   flushing said reverse osmosis membrane of said fresh water generating cartridge at prescribed timing by allowing an intermittent increased flow of concentrated water from the membrane, said flow otherwise being suppressed by a pressure regulating valve;
   wherein said reverse osmosis membrane has a permeate flux of at least 0.1 $m^3/m^2 \cdot day \cdot kgf/cm^2$ and a rejection performance of at least 95% for an NaCl aqueous solution of 0.05% concentration.

16. The fresh water generating method in accordance with claim 15, further comprising a step of discharging a permeated liquid obtained from said fresh water generating cartridge through a permeated liquid discharge path at prescribed timing.

17. The fresh water generating method in accordance with claim 15, further comprising a step of applying a permeated liquid obtained from said fresh water generating cartridge to a liquid selected from the group consisting of wash water, soft water for a boiler, soft water for preparing food, agricultural water for hydroponics, pure water for a laboratory, water for a humidifier, and potable water.

18. The fresh water generating method in accordance with claim 15; further comprising a step of feeding a permeated liquid obtained from said fresh water generating cartridge to an ion exchanger or a continuous electric regenerative ion exchanger.

19. A fresh water generating method comprising the steps of:
   feeding a target liquid having a prescribed pressure to a fresh water generating cartridge including a reverse osmosis membrane without step-up means for stepping up the pressure; and
   flushing said reverse osmosis membrane of said fresh water generating cartridge at prescribed timing by allowing an intermittent increased flow of concentrated water form the membrane, said flow otherwise being suppressed by a pressure regulating valve;
   wherein the ratio b/a of the flow rate b of a permeated liquid obtained from said fresh water generating cartridge to the flow rate a of said target liquid fed to said fresh water generating cartridge is b/a >0.5.

* * * * *